US 6,748,907 B2

United States Patent
Malmquist et al.

(10) Patent No.: US 6,748,907 B2
(45) Date of Patent: Jun. 15, 2004

(54) DEVICE INCLUDING A COMBUSTION ENGINE, A USE OF THE DEVICE, AND A VEHICLE

(75) Inventors: Anders Malmquist, Täby (SE); Lars Gertmar, Västerås (SE); Harry Frank, Västerås (SE); Chandur Sadarangani, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/168,401

(22) PCT Filed: Dec. 22, 2000

(86) PCT No.: PCT/SE00/02658
§ 371 (c)(1),
(2), (4) Date: Jun. 21, 2002

(87) PCT Pub. No.: WO01/45977
PCT Pub. Date: Jun. 28, 2001

(65) Prior Publication Data
US 2003/0024492 A1 Feb. 6, 2003

(30) Foreign Application Priority Data
Dec. 22, 1999 (SE) ................................. 9904733

(51) Int. Cl.$^7$ ............................................. F02B 71/00
(52) U.S. Cl. ..................................................... 123/46 E
(58) Field of Search ....................................... 123/46 E

(56) References Cited

U.S. PATENT DOCUMENTS

| 4,532,431 | A | * | 7/1985 | Iliev et al. ............... 123/46 E |
| 4,965,864 | A | | 10/1990 | Roth et al. |
| 5,002,020 | A | | 3/1991 | Kos |
| 5,081,381 | A | | 1/1992 | Narasaki |
| 5,172,784 | A | | 12/1992 | Varela, Jr. |
| 5,287,827 | A | | 2/1994 | Almendinger et al. |
| 5,347,186 | A | | 9/1994 | Konotchick |
| 5,788,003 | A | | 8/1998 | Spiers |

FOREIGN PATENT DOCUMENTS

| DE | 4413351 | 10/1995 |
| DE | 19644863 | 5/1998 |
| DE | 19813992 | 10/1999 |
| EP | 0120986 | 10/1984 |
| EP | 0221228 | 5/1987 |
| EP | 0622887 | 11/1994 |
| JP | 59044962 | 3/1984 |
| SE | 9900184-4 | 1/1999 |
| WO | 94/26020 | 11/1994 |

\* cited by examiner

Primary Examiner—Noah P. Kamen
(74) Attorney, Agent, or Firm—Oblon, Spivak, McClelland, Maier & Neustadt, P.C.

(57) ABSTRACT

A device that includes a combustion engine with a piston that is mechanically freely movable in a housing. The device permits combustion of a fuel mixture to produce a pushing force to the piston. The device includes an electromagnetic energy transducer and an external current circuit, which is connected to the energy transducer for exchange of effect in a direction to or from the energy transducer. A control unit controls the direction of the effect, which is exchanged between the energy transducer and the external current circuit, during operation of the device. Such a device can be used to generate electrical energy, and can be employed in a vehicle.

26 Claims, 8 Drawing Sheets

DEVICE INCLUDING A COMBUSTION ENGINE, A USE OF THE DEVICE, AND A VEHICLE

BACKGROUND OF THE INVENTION

1. Field of the Invention

The present invention refers to a device including a combustion engine with a piston mechanically freely movable in a space in a housing, where the device permits combustion of a fuel mixture to produce a pushing force to the piston, an electromagnetic energy transducer, and an external current circuit connected to the energy transducer for exchange of effect in a direction to or from the energy transducer. The invention also refers to a use of the device, and a vehicle.

2. Discussion of the Related Art

A known driving source for motor vehicles, such as private cars, buses and trucks, is combustion engines with internal intermittent combustion. Combustion engines are used also in other contexts, such as for garden machines, contractor machines etc., and for generating an electric effect (a so called diesel-driven generating set). The combustion engine normally has one or several pistons moving reciprocally in a cylinder housing. The rectilinear movement of the pistons, which is provided by the intermittent combustion, is transferred to a rotary movement of a crank shaft via a connecting rod, which is mechanically connected to the pistons and the crank shaft. The rotary movement of the crank shaft is transferred to the drive wheels of the vehicle via a transmission mechanism including a gear box and a clutch device. A continuous crank shaft rotation can be obtained with a relatively oscillation-free rotational velocity in spite of a strongly varying moment by the connecting rods and the crank shaft. However, the connecting rod and the crank shaft form an extensive arrangement of shaft lines, which can cause a mechanical resonance. Furthermore, the crank shaft is generally connected with a fly wheel, which may reduce the resonance problems and absorb the effect pulsations caused by the intermittent combustion, and the impulse which is transferred to the pistons.

The transfer of energy from the pistons to the driving wheels of the vehicle via the arrangement including the connecting rods and the crank shaft results in radial forces, large energy losses and, reduces positioning accuracy for each additional mechanical arrangement which is required. To a certain extent the energy losses can be reduced by new materials having a lower friction and a higher temperature resistance, improved control possibilities of the fuel injection etc., but can never be avoided.

Due to the connection of the piston to the crank shaft, the position of the piston in the cylinder housing, for instance at the top dead center, will be predetermined. Consequently, the possibilities to vary the compression during operation are limited.

To reduce the energy losses in the transfer of energy from the piston to the driving wheels of a vehicle, for instance, so called free-piston engines have been proposed. As disclosed herein, the term free-piston engine means an engine with a piston mechanically freely movable in a cylinder housing. Consequently, there is no mechanical element, such as a connecting rod or a crank shaft, for the transfer of energy from the piston. Rather, the kinetic energy of the piston is transformed directly to electrical energy. Such an energy transformation may be provided by a magnetic element in the piston and an electromagnetic element in the wall of the cylinder housing.

U.S. Pat. No. 5,788,003 to Spiers discloses a free-piston type combustion engine for driving a motor vehicle. The engine acts with an integrated electric generator. The piston, which has an inner electrically conducting winding, is arranged to perform a reciprocating movement in relation to a surrounding outer winding. During operation, the outer winding produces a magnetizing field, wherein electric effect is generated in the inner winding. The generated electric effect is obtained from the inner winding by a mechanical commutator. The electric effect may be used by an electric motor for driving the vehicle. The commutator is subject to wear and has a limited life time. The electric generator lacks a soft magnetic flow carrier, which means that a relatively low efficiency is obtained.

U.S. Pat. No. 5,172,784 to Varela refers to a hybrid drive system for motor vehicles. The drive system includes a free-piston-like type combustion engine with two parallel cylinders for respective pistons. Each cylinder includes an integrated linear electric generator with windings and magnetic elements provided in the pistons of the engine. The magnetic elements perform a reciprocating movement, and are provided such that parts of the elements move within and parts move outside the windings to create a high flow density. To synchronize the movement of the two pistons, the two pistons are mechanically connected to each other via a synchronizing crank shaft, such that the positions of the pistons are relatively predetermined. However, this electric generator lacks soft magnetic flow carriers.

U.S. Pat. No. 5,347,186 to Konotchick refers to a linear electric generator in which a magnet and a winding move in relation to each other. The relative movement of the winding in the magnetic field generates a current in the winding, which may be used by an external current circuit. The patent describes the basic principles for magnetic induction, which is a well known phenomenon. The patent discloses a member maintained in a neutral position for the relative movement.

Furthermore, W094/26020, discloses a linear electric machine operating according to the reluctance principle. U.S. Pat. No. 4,965,864 discloses a linear electric motor operating as a pump or compressor. U.S. Pat. No. 5,081,381 discloses an electromagnetic maneuvering member with a magnetic rod linearly displaceable by three electromagnets surrounding the rod. EP-A-622887 discloses a linear pulse motor having a core, carrying a permanent magnet linearly displaceable by electromagnets of a surrounding stator. EP-A-221228 discloses an electromagnetic maneuvering device with a linearly displaceable core carrying permanent magnets. The core is displaceable by electromagnets provided in a housing and surrounding the core. JP-A-59044962 discloses an electromagnetic stator device forming a path between magnet poles for a displaceable element.

SUMMARY OF THE INVENTION

The object of the present invention is to provide a combustion engine with a high efficiency. Furthermore, it is aimed at improved control of a combustion engine.

This object is obtained by the device including a control unit, which, during the operation of the device, is arranged to control the direction of the effect which is exchanged between the energy transducer and the external current circuit. By such a control unit, it is possible to determine the instantaneous position of the piston in the housing. By returning effect to the piston via the energy transducer, the piston may be displaced to a desired position when, for instance, a combustion is to be initiated. Depending on the actual operational state, this position may be varied between different strokes of the combustion engine. The control unit with the energy transducer functions as a connecting rod with adjustable length. Simultaneously the compression may be varied and controlled, for instance depending on the instantaneous load on the combustion engine. At powerful acceleration, the compression may be increased for a larger effect output from the combustion engine, and during normal operation, the compression may be optimized with regard to emissions. In addition, the compression may be adapted to different types of fuel.

According to an embodiment of the invention, the control unit is arranged to control the size of the effect. Thus, the control possibilities are further improved with regard to the determination of the instantaneous position of the piston. Preferably, the control unit is arranged to control the size of the effect in a continuous manner.

According to a further embodiment of the invention, the control unit is arranged to control the combustion by the control. The time for initiating the combustion may be controlled. Advantageously, the device includes at least one sensor member arranged to sense the position of the piston in the housing. The sensed position is transferred to the control unit as a control parameter.

According to a further embodiment of the invention, the control unit includes at least one computer reproducing the device. The software may be stored in the computer or be provided or updated from an internal learning process or from an external source via any data-communication system. The software provides a model of the device or system. The model is adaptable to changes in the system. In the model, the different components of the device or the system are represented by different parameters and functions.

According to a further embodiment of the invention, the control unit includes a first converter, which with a first connection point is connected to the energy transducer and with a second connection point via an electric connection is connected to a first connection point of a second converter, which with a second connection point is connected to the current circuit. The converters may be realized by power electronics based on diodes and IGBT-valves (Insulated Gate Bipolar Transistor) with small silicon areas and a small thermal capacitance. Advantageously, the first converter and the second converter may be controlled by the computer.

According to a further embodiment of the invention, an energy storing member is arranged to enable storing of at least of a part of the energy generated by the combustion. Advantageously, the energy stored by the energy storing member may be utilized for positioning the piston. The energy storing member may be realized in many different manners and for instance be formed by the vehicle, wherein the kinetic energy of the vehicle is utilized for generating electric effect in the electric drive motors of the vehicle and the electric effect may be transferred to the piston via the energy transducer. Consequently, the energy storing member may be arranged to store electric energy and to be connected to the control unit, for instance, the energy storing member may be connected to the connection via a converter. The energy storing member may also include a capacitor, an electrochemical accumulator and/or a flywheel. Furthermore, the energy storing member may be connected to said space and include a pressure vessel and/or a spring member, such as a gas spring.

According to a further embodiment of the invention, the electromagnetic energy transducer includes a primary transducer member connected to the piston, and a second transducer member, which is stationary in relation to the housing. The primary transducer member is movable relative to the housing and the secondary transducer member. The movement of the piston in the housing is directly converted to electric effect without any power transfer via mechanical components. Thereby, one of the transducer members may include an electromagnetic element and another of the transducer members a magnetic element. Advantageously, the electromagnetic element includes at least one winding having connections to the external current circuit.

According to a further embodiment of the invention, the secondary transducer member includes a plurality of electromagnetic elements provided beside each other in a wall of the housing along the moving direction of the piston. At least a part of the electromagnetic elements has a different design. The differing design may refer to, for instance, the size of the electromagnetic elements, the winding density, the number of winding rounds, current loading etc.

According to a further embodiment of the invention, the electromagnetic element includes a first soft magnetic flow carrier and the magnetic element includes a second soft magnetic flow carrier. The first soft magnetic flow carrier and the second soft magnetic flow carrier may form a soft magnetic circuit.

According to a further embodiment of the invention, the magnetic element includes at least one permanent magnet producing a magnetizing field. The first soft magnetic flow carrier is provided in connection to the permanent magnet to collect and concentrate the magnetic flow from the permanent magnet so that a concentrated magnetic flow flows around the winding through the soft magnetic circuit.

According to another embodiment of the invention, the second soft magnetic flow carrier has a reluctance perpendicular to the moving direction of the piston, which varies along the moving direction of the piston. The energy transducer forms a so called reluctance machine.

According to an advantageous application of the invention, the device may be utilized for generating electric energy.

According to another advantageous application, the invention refers to a vehicle including at least one electric motor for the propulsion of the vehicle and at least a device generating electric effect to the electric motor. Such a vehicle may include connections for the output of electric effect for external consumption.

BRIEF DESCRIPTION OF THE DRAWINGS

The present invention is now to be explained more closely by means of different embodiments, which are disclosed merely as examples, and with reference to the drawings attached, in which FIG. 1 discloses schematically a view of an embodiment of a device according to the invention.

DETAILED DESCRIPTION OF THE PREFERRED EMBODIMENTS OF THE INVENTION

Figure 1:
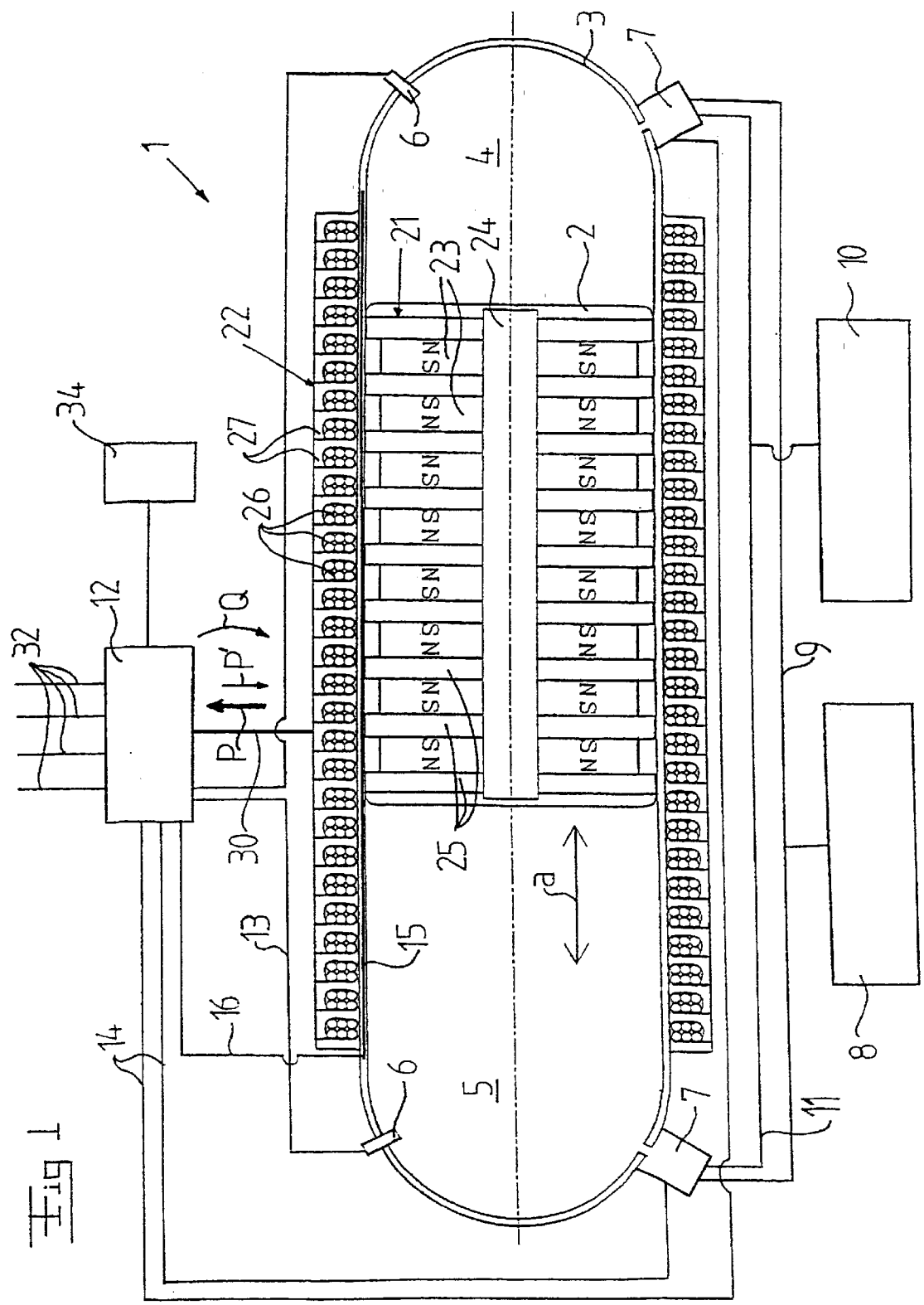

FIG. 1 discloses a device according to the present invention. The device includes a combustion engine 1 with a piston 2, which is mechanically freely moveable in a housing 3. In the example disclosed, the housing 3 has a cylindrical shape. The piston 2 may move in a rectilinear reciprocating movement in the housing 3 in the movement direction a. The housing 3 also may have an extension, which is not rectilinear but bow-shaped. The piston 2 is mechanically freely moveable in the housing such that it is loosely provided in the housing 3, i.e. it is not mechanically connected to any element for the transfer of a force, for instance, via a connecting rod and a crank shaft. In the example disclosed, a combustion engine 1 with a housing 3 and a piston 2 is disclosed. However, it is to be noted that a combustion engine within the scope of the present invention also may include more than one housing and one piston. To increase the possible effect from the combustion engine 1 or improve the mechanical balancing, an arbitrarily number of housings 3 with a respective piston 2 may be permitted to be comprised by the combustion engine 1. The combustion engine 1 disclosed is a suitable unit in a modular structure. The same combustion engine 1 may be utilized as a motor module for all conceivable applications, wherein only the number of modules is varied. At an increased load on an application, the number of activated modules may be increased successively, wherein the effect output will be proportional to the number of activated modules so that each module may operate at an optimal efficiency.

The combustion engine 1 may operate according to known combustion engine principles. For instance, the combustion engine 1 may be an Otto cycle engine or a diesel engine, which operates in two strokes or four strokes. The combustion engine may also include a so called HCCI-engine (Homogeneous Charge Compression Ignition), which may be regarded as a combination of an Otto Cycle engine and a diesel engine, wherein a mixture of oxidator and fuel is introduced into the combustion chamber and ignited at a high compression by self-ignition. Except for combustion engines with internal combustion, i.e. in the housing 3, the combustion engine 1 may also include external combustion, for instance, a Stirling engine. Below an embodiment is described, which refers to an Otto cycle motor, but which also is applicable to other engine types.

Figure 8:
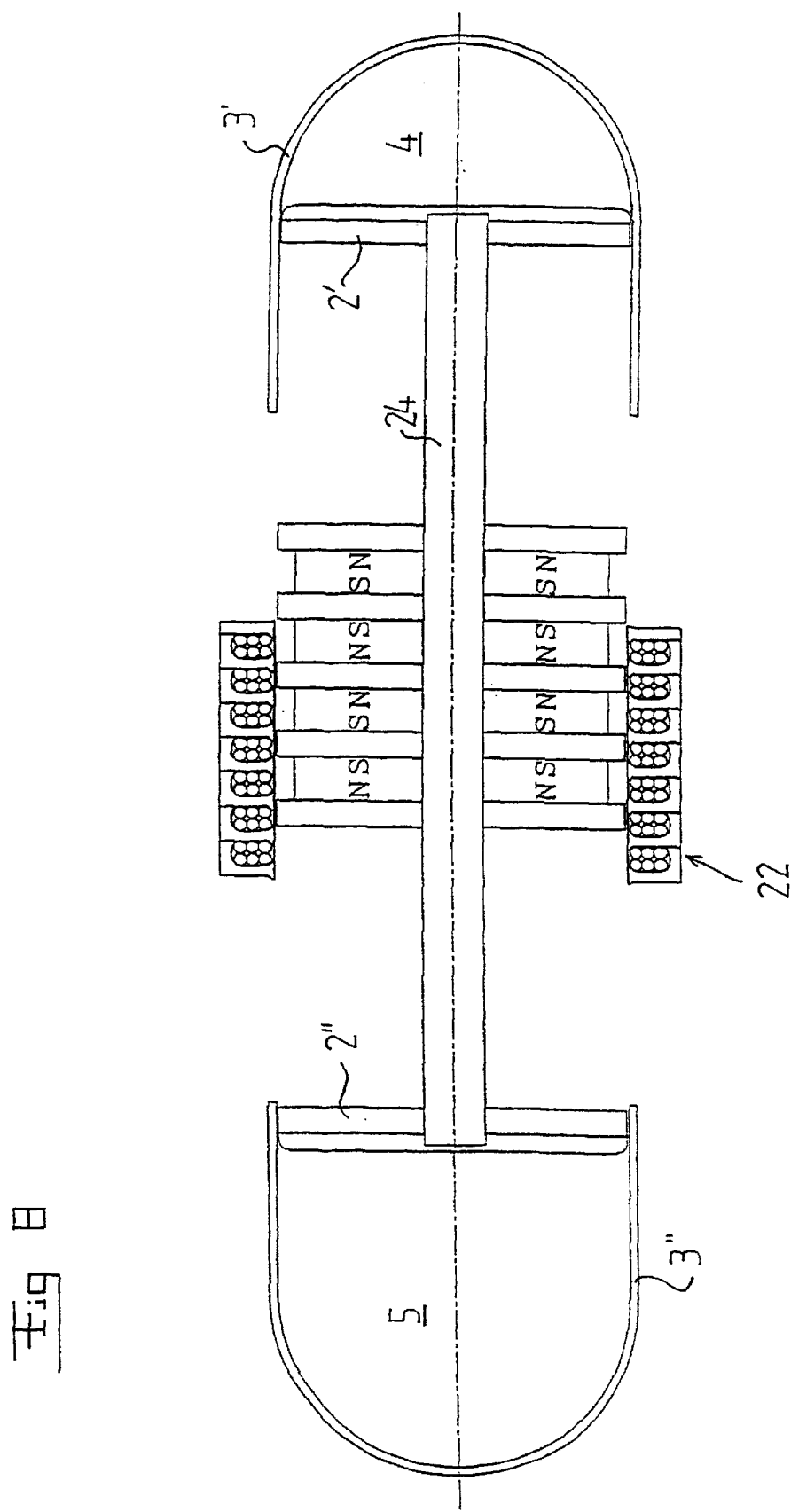
FIG. 8 discloses schematically a view of a fifth embodiment of a device according to the invention.

The housing 3 includes an inner space, which in the example disclosed forms two combustion chambers 4 and 5. One combustion chamber 4, 5 is provided on each side of the piston 2. It is to be noted here that the housing 3, within the scope of the invention may be divided into two housings 3', 3", wherein each housing forms one of the combustion chambers 4 and 5. Such an embodiment is schematically disclosed in FIG. 8. The piston 2 thereby includes two piston portions 2', 2", one in each housing or combustion chamber, and the two pistons portions may be connected to each other via a rigid bar. This bar may be located outside both the housings. The housings 3', 3", may, however, be connected to each other via common casing or the like, in which the bar is located. For ignition and initiating of an intermittent combustion in the respective combustion chamber 4, 5, for instance, a spark plug 6 may be provided in each combustion chamber. Each combustion chamber 5 may, furthermore, in actual cases include valve members 7 or any similar members that permit supply of fuel and oxidator, and removal of combustion gases. The valve members 7 may be of any conventional design, and will not be further described in this application. It is only to be noted that the valve members 7 are connected to a fuel source via a fuel conduit 9, and a source 10 for an oxidator, for instance air, via a supply conduit 11. The function of the valve members 7 during operation of the combustion engine 1 is controlled by a control unit 12 arranged to initiate delivery of voltage pulses to the spark plugs 6 when the combustion is to be initiated. The control unit 12 is connected to the spark plugs 6 via the connection lines 13 and the valve members 7 via connection lines 14.

The device also includes a schematically disclosed sensor member 15 arranged to sense the position of the piston 2 in the housing 3. The sensor member 15 is connected to the control unit 12 via a connection line 16.

The device includes an electromagnetic energy transducer including a primary transducer member 21 connected to the piston 2, and a secondary transducer member 22, which is stationary in relation to the housing 3. The primary transducer member 21 is thus moveable in relation to the secondary transducer member 22. The primary transducer member 21 includes a number of annular permanent magnets 23 provided after each other on a non-magnetic core 24 of, for instance, stainless steel. In the embodiment according to FIG. 8, the core 24 may form the rod carrying the primary transducer member 21 outside the two housings 3', 3". Annular disc elements 25 are provided between adjacent permanent magnets 23. The annular disc elements 25 are manufactured of a soft magnetic material. In the application, soft magnetic material refers to a magnetic material with a relative permeability which is greater than 1. Preferably, soft magnetic materials with a relative permeability greater than 50 are used. More preferably, the relative permeability may be in the order of 100 or greater. Soft magnetic elements are suitable as carrier of a magnetic flow and are therefore designated as flow carrying elements 25. The permanent magnet 23 may be manufactured in NdFeB or SmCo. The permanent magnets 23 and the flow carrying elements 25 form a cylindrical element, which is displaceable in the moving direction a of the piston 2.

The secondary transducer member 22 includes a number of annular electromagnets 26 provided in the wall of the housing 3 such that they surround the permanent magnets 23. Each electromagnet 26 includes a winding and is surrounded of a soft magnetic flow carrying element 27 that has a substantially L-shaped cross-section. As shown in FIG. 1, each electromagnet 26 is surrounded by flow carrying elements 27. The flow carrying elements 25 and the flow carrying elements 27 act such that they form soft magnetic circuits around the windings of the electromagnets 26. The soft magnetic circuits extend from the positive poles N of the permanent magnet 23 via the flow carrying elements 27, 25 around one or several windings or via the next flow carrying element 27 back to the negative pole S of the permanent magnet 23. The permanent magnets 23 have a smaller radius than the adjacent flow carrying elements 25 so that an air-gap is formed between the permanent magnets 23 and the electromagnets 26. The airgap between the flow carrying elements 25 and 27 has a smaller magnetic resistance (reluctance) than the longer but direct way between the flow carrying elements 24. This ensures that the main part of the magnetic flow goes over the air-gap between the flow carrying elements 25 and 27.

The magnet poles N, S of the permanent magnets 23 are provided in the moving direction a of the primary transducer member 21, and have a relatively large effective magnet pole surface, from which a magnetic flow is outputted. Permanent magnets 23 are provided in an alternative manner as disclosed in FIG. 1 so that pairs of permanent magnets lying after each other have opposite pole direction, i.e. the negative poles S face each other and the positive poles N face each other. The flow carrying element 25 provided against the positive N pole surface of the permanent magnet 23 collects the magnetic flow from the pole surface of the permanent magnet 23, and concentrates this flow in a direction towards one or several flow carrying elements 27 of the electromagnet 26 such that a high flow density in the air-gap and in the flow carrying elements 27 around the windings is obtained.

Figure 3:
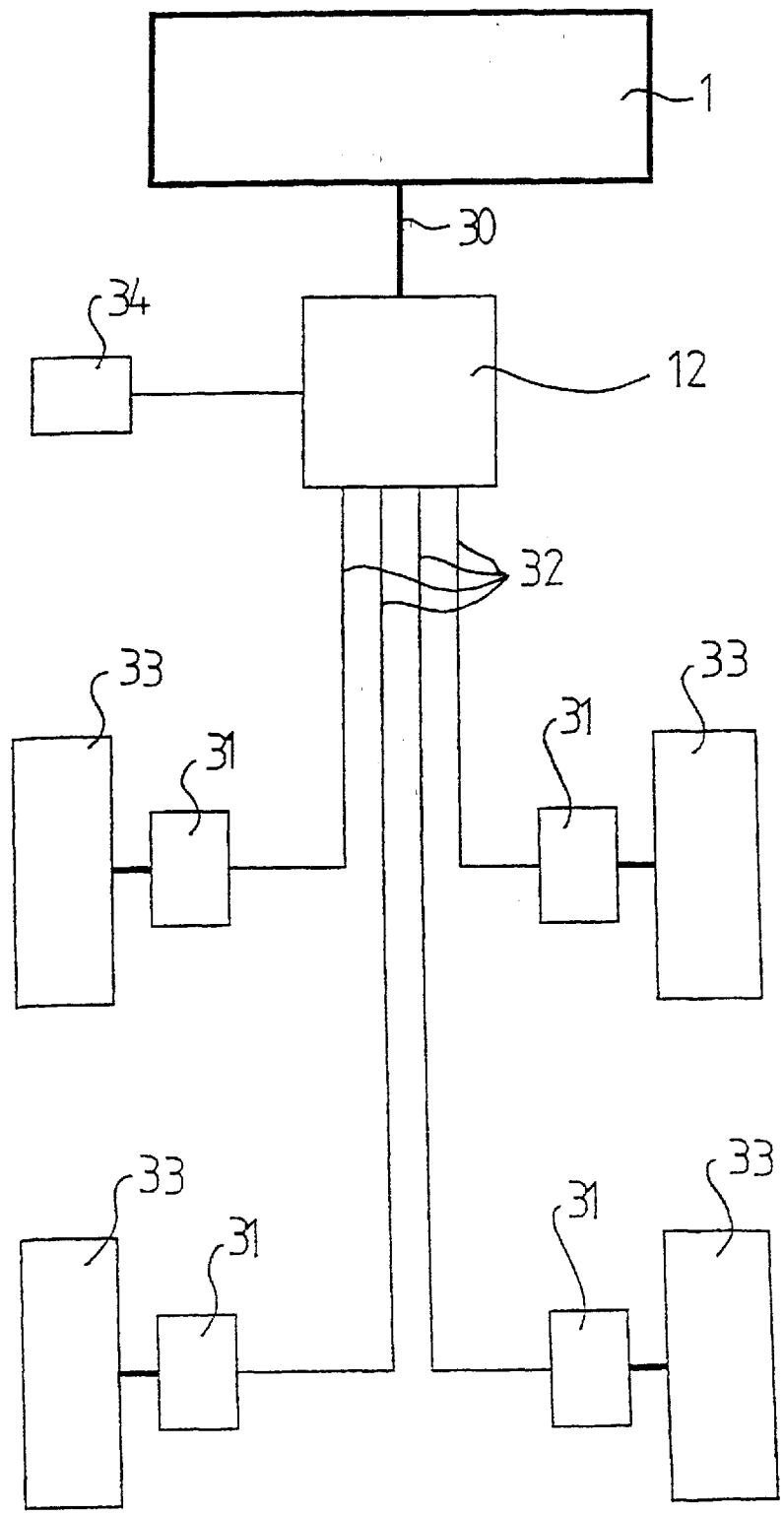
FIG. 3 discloses schematically a vehicle with a device according to the invention.

The winding of each electromagnet 26 is connected to an external current circuit via electric lines, which are illustrated schematically by the connection line 30. The external current circuit may include an effect consumer, which in FIG. 3 is shown as drive motors 31 connected via respective connection lines 32. Each drive motor 31 is arranged to drive a respective wheel 33 of the vehicle schematically indicated in FIG. 3. The vehicle may include more or less than four drive motors 31 and, for instance, may be provided with conventional power transfer via a propeller shaft. The external current circuit may also include an energy storing member 34, for instance in the form of a capacitor or a battery, such as a lead accumulator, or connections 35 for feeding electric effect to an external consumer, such as lightening, tools etc.

During operation of the device, the control unit 12 is arranged to control the effect exchanged between the energy transducer 21, 22 and the external current circuit (e.g., the drive motors 31 and the energy storing member 34). The effect exchange, which varies with the time and the movement of the piston 2, is illustrated in FIG. 1 by the arrows P and P'. The combustion engine 1 will generate an active effect P, which, in accordance with the purpose of the combustion engine 1, is in average substantially greater than the active effect P', which is fed back by means of the energy transducer 21, 22 for influencing and positioning the piston 2. The control unit 12 is also arranged to control the size of the effect P, P' in both the directions in a continuous manner. The control unit 12 is dimensioned for feeding back reactive effect to the energy transducer 21, 22, which is illustrated by the arrow Q. The peak effect from the energy transducer 21, 22 may be increased since the reactive effect Q to a larger or smaller extent provides the magnetic flow of the energy transducer 21, 22.

Figure 2:
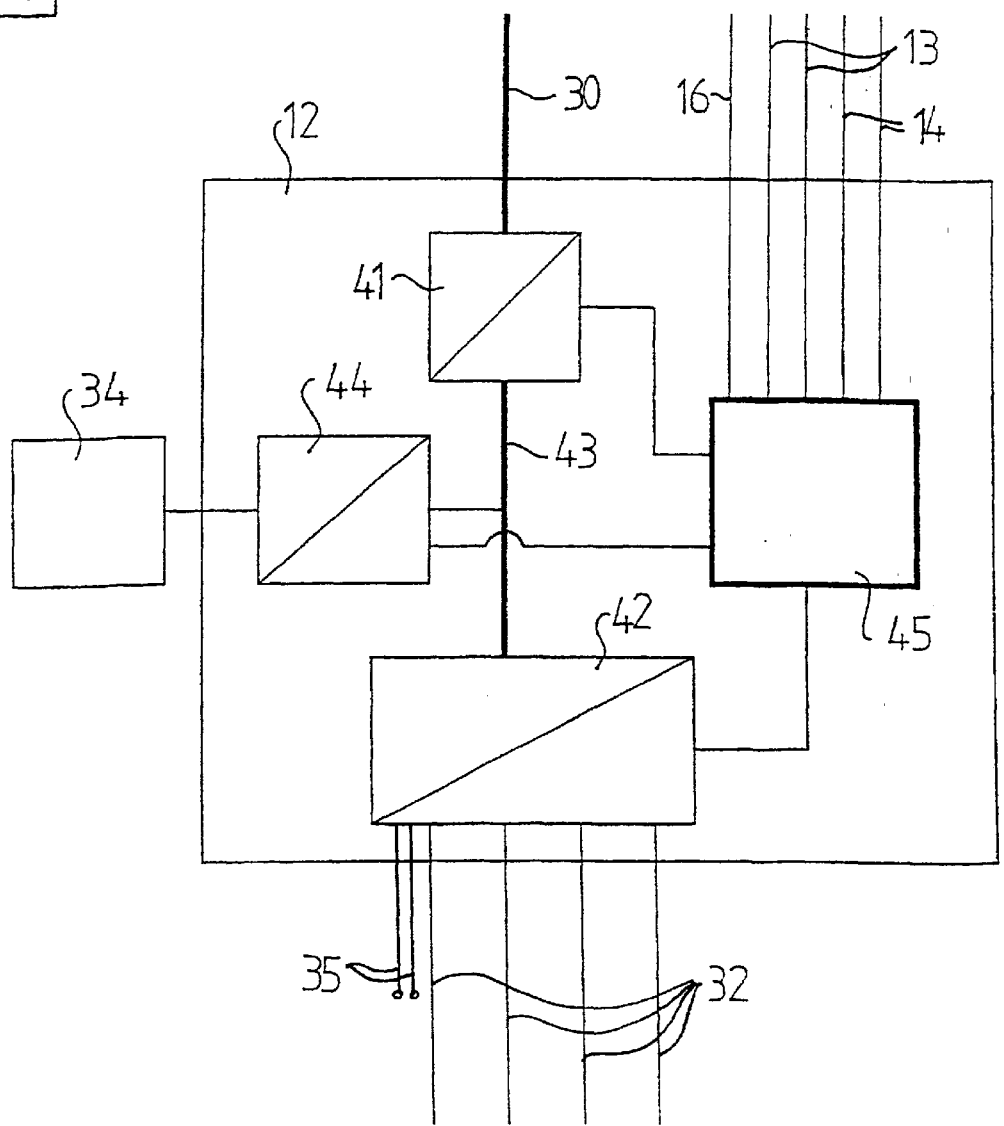
FIG. 2 discloses schematically a design of a control unit of the device.

FIG. 2 discloses an example of how the control unit 12 may be designed. The control unit 12 includes a first converter 41, which with a first connection point is connected to the energy transducer 21, 22 via the connecting line 30 and with a second connection point is connected to a first connection point of a second converter 42 via an electric connection 43.

The second converter 42 is with its second connection point connected to the external current circuit (e.g., the drive motors 31 via the connection lines 32). The first converter 41 may for instance be an AC/DC-converter and the second converter 42 is a DC/AC-converter. The invention is not limited to these types of converters but these may be of all available types, i.e. AC/DC, DC/AC, DC/DC or AC/AC. Furthermore, the control unit 12 includes a third converter 44, which with a first connection point is connected to the second connection point of the first converter 41 and with a second connection point is connected to the external current circuit here represented by the energy storing member 34. In the example disclosed, the third converter 44 is a DC/DC-converter. Of course, also in this case other types of converters may used. The converters 41, 42 and 44 include power electronics, preferably with diodes and IGBT-valves. It is also to be noted that two or three of the converters 41, 42 and 44 may form an integrated converter unit.

In addition, the control unit 12 includes a computer 45, with one or several microprocessors, at least one memory, unit and suitable members for communication. The computer 45 is arranged to control the converters 41, 42 and 44. Moreover, the computer 45, in the example disclosed, is connected to the spark plugs 6 and the valve members 7 via the connection lines 13 and 14. The computer 45 receives signals from a plurality of the different seniors and sensing members of the combustion engine 1 and the vehicle. In the example disclosed, this is illustrated merely by the position sensing member 15 and the connection line 16. The combustion engine 1 and its function are reproduced in the computer 45 by the signals from different sensing members and by the software. This software may be stored in the computer 45 or received from an external computer source via any data-communication system.

With knowledge about the instantaneous desired load, which may be received at least partly from the throttle, and the position of the piston 2 in the housing 3, the fuel and air supply to the combustion chambers 4, 5 concerned and the ignition moment of the spark plugs 5 may be controlled by the computer 45. In addition, the electric effect may be directed to or from the energy transducer 21, 22 to obtain a desired position of the piston 2 and thus a desired compression in the combustion chambers 4, 5 concerned to meet the desired effect need.

Figure 4:
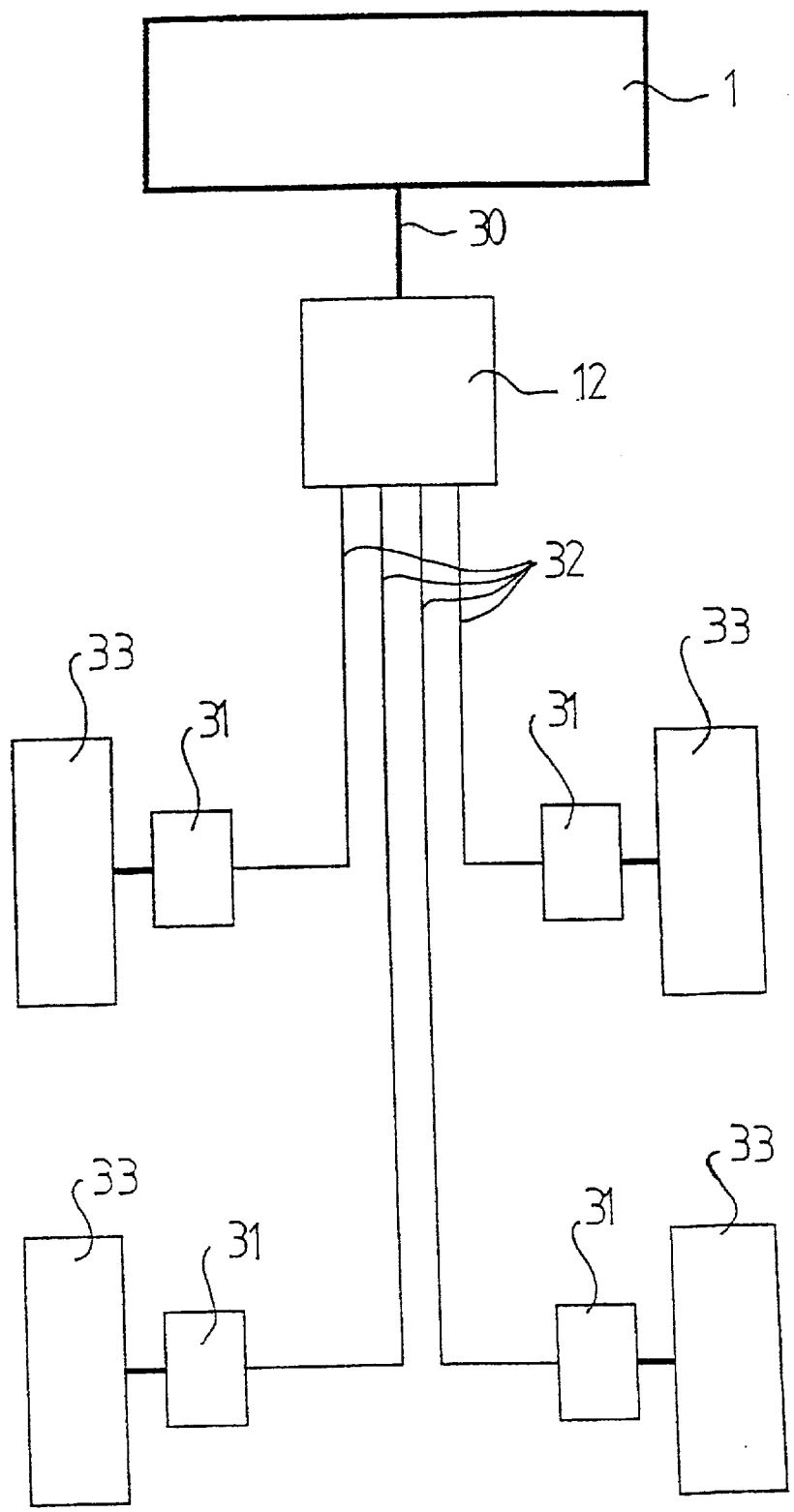
FIG. 4 discloses schematically a vehicle with a device according to another embodiment of the invention.

FIG. 4 discloses another embodiment of a vehicle having a device without the energy storing member 34. According to this embodiment, the kinetic energy of the vehicle may be utilized as an energy storing member. Rotation of the wheels 33 will drive the drive motors 31, which generates electric effect that by means of the control unit 12 and the energy transducer 21, 22 may be fed back to the piston 2 for the positioning thereof.

Figure 5:
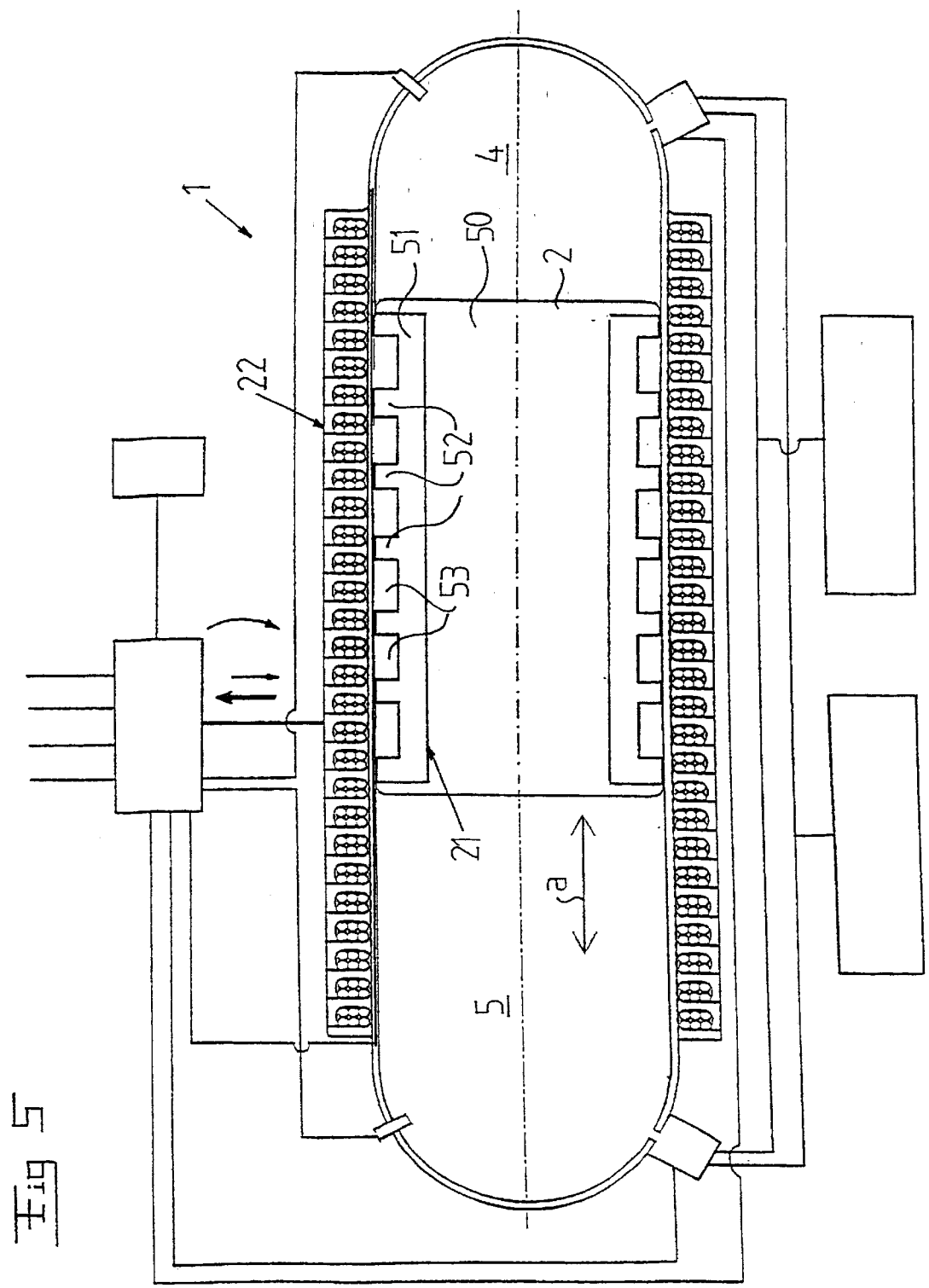
FIG. 5 discloses schematically a view of a second embodiment of a device according to the invention.

FIG. 5 discloses another embodiment of a combustion engine 1 according to the invention. This combustion engine 1 differs from the combustion engine 1 in FIG. 1 with regard to the energy transducer, which in this embodiment is a so called reluctance machine. The secondary transducer member 22 is designed in principally the same way as the one in the embodiment disclosed in FIG. 1. The primary transducer member 21 is also provided in the piston 2, which includes a core 50 of non-magnetic material, for instance stainless steel. The primary transducer member 21 includes a flow carrying element 51 of a soft magnetic material. The flow carrying element 51 is designed in such a way that it along its moving direction a has portions with a varying magnetic reluctance, measured in a direction perpendicular to the moving direction a. In the embodiment disclosed this has been achieved since the flow carrying element 51 includes separated projections 52 in the moving direction a. Interspaces 53 are formed between the projections 52 with a relatively high magnetic reluctance for flow from the flow carrying element 27 of the secondary transducer member 22. These interspaces 53 may preferably be filled by a non-magnetic material. The flow carrying element 51 forms a second part of a magnetic circuit through and between two projections 52. By feeding current through the windings of the different electromagnets 26 in a suitable manner, movement of the piston 2 can be obtained since the piston 2 tends to take a position where the reluctance in said magnetic circuit is minimized.

Figure 6:
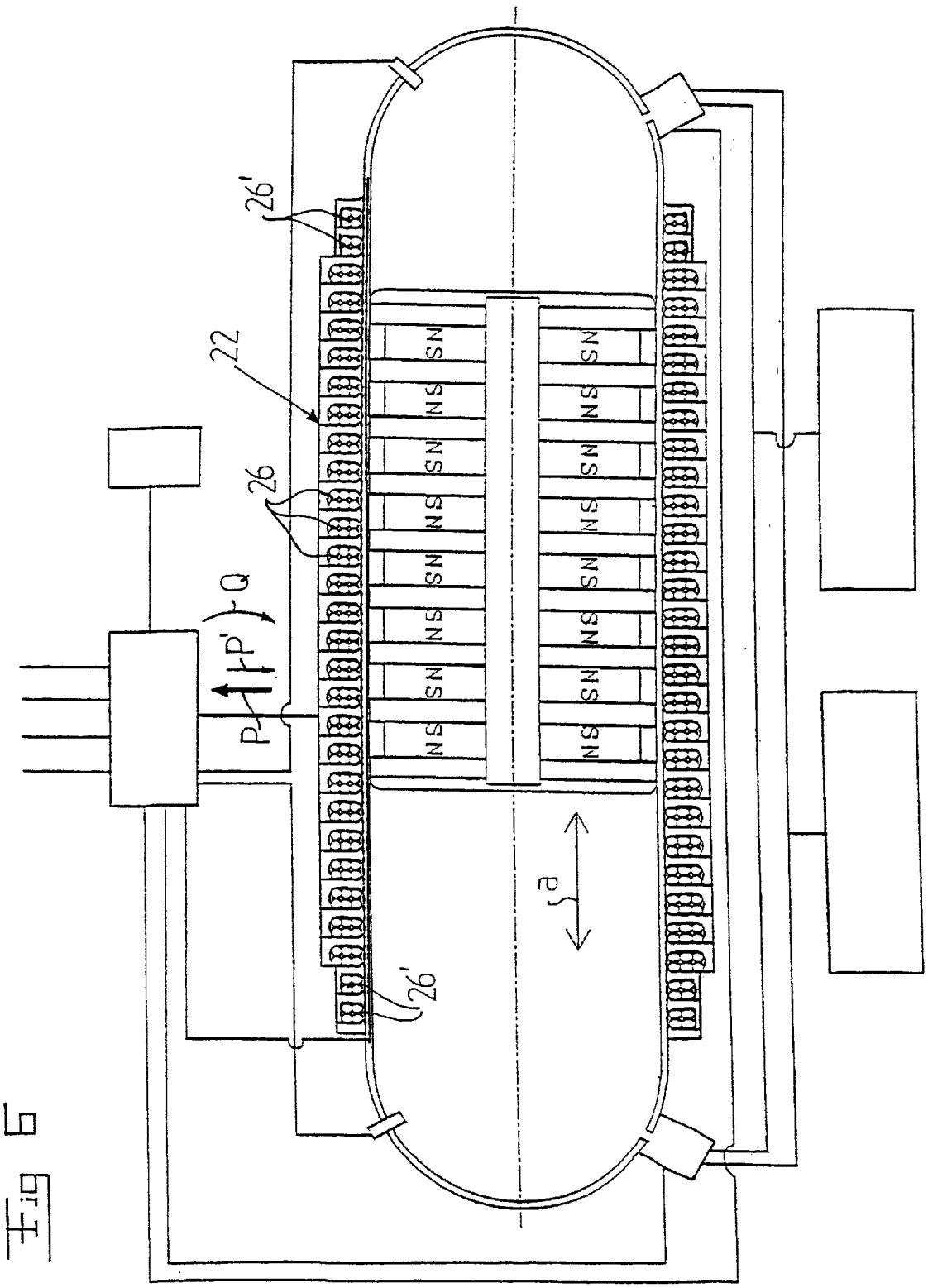
FIG. 6 discloses schematically a view of a third embodiment of a device according to the invention.

FIG. 6 discloses a further embodiment of the invention, which differs from the embodiment in FIG. 1 by a different design of the electromagnets 26. In the example disclosed in FIG. 6, the two outermost electromagnets 26' are smaller than the rest of the electromagnets 26. It is to be noted that the electromagnets may include different elements 26', which differ in other manners than solely by the size. For instance, they may differ with regard to the winding density, the number of winding rounds, the current loading etc. It is also to be noted that others than the two outermost electromagnet 26' may be different.

The energy storing member 34 may include, for instance, a capacitor, which quickly may be charged by energy and from which energy may be obtained very quickly. The energy storing member 34 may also include a battery, for instance in the form of an accumulator, such as a lead, Ni-MH- or NiCd-accumulator. The energy storing member 34 may also, as an alternative or a supplement, include new storing members, for instance so called super-capacitors. Furthermore, the energy storing member 34 may include an electric machine having a rotatable shaft mechanically connected to a fly wheel. The energy storing member may also be directly associated with the space in the housing 3. Thereby, the energy storing member, as is disclosed in the embodiment in FIG. 7, may include a pressure vessel 61 connected to one of the combustion chambers 4 by a conduit 62, which in this case does not contain any equipment for the supply of fuel/air or removal of exhaust gases. No combustion takes place in the combustion chamber 4 but the combustion takes place in the second combustion chamber 5. When the piston 2 is displaced in the direction towards the combustion 4, gas present therein will be pressed to the pressure vessel 61 in which a pressure is built up. The flow between the pressure vessel 61 and the combustion chamber 4 may be controlled by means of a three-way control valve 63 connected to the computer 45 of the control unit 12 via a connection line 64. The pressure vessel 61 may function as a sort of gas spring ensuring the return of the piston 2 and, consequently, the compression in the combustion chamber 5.

Figure 7:
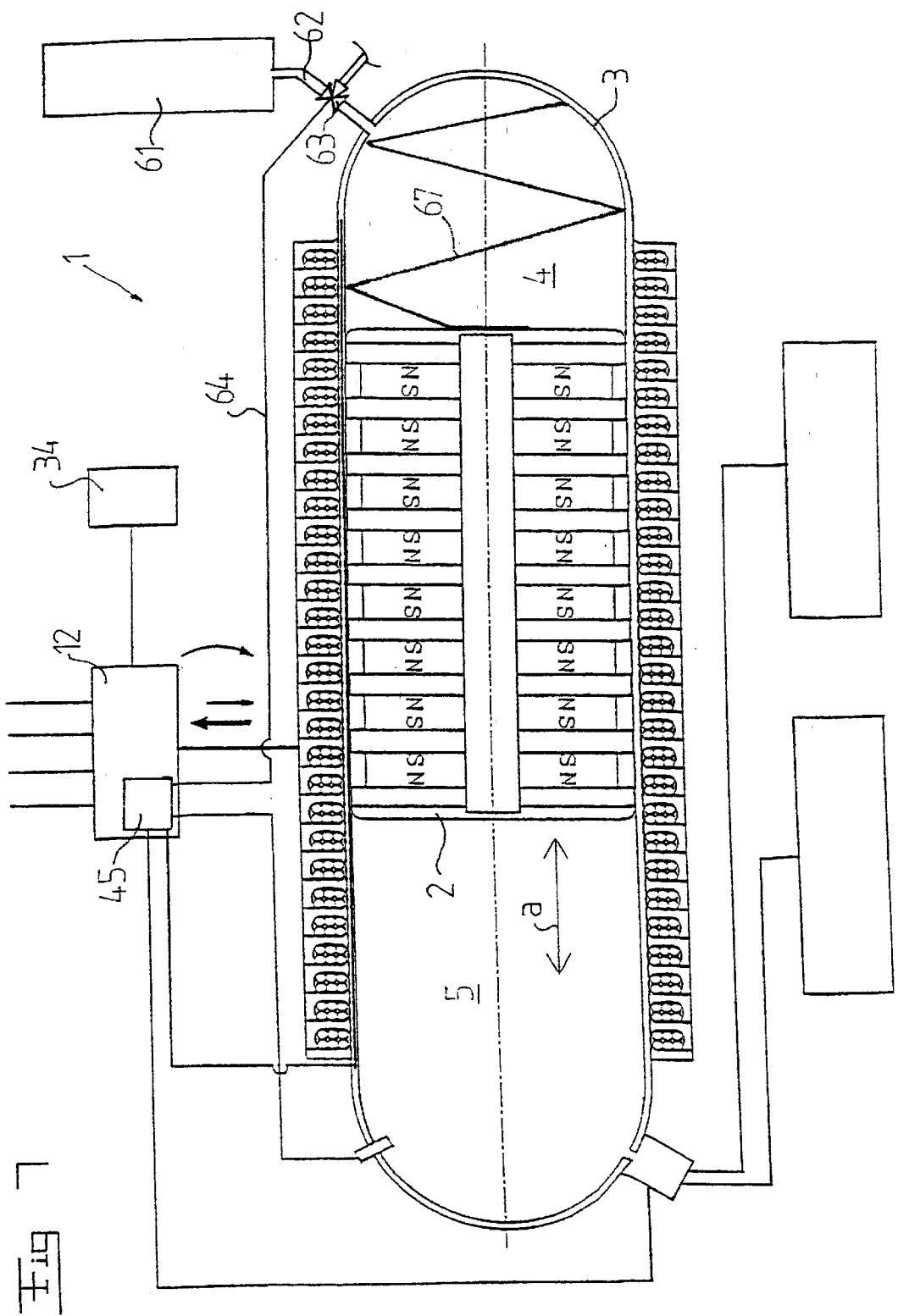
FIG. 7 discloses schematically a view of a fourth embodiment of a device according to the invention.

According to a further variant of the energy storing member, this may include a spring 67 which is also disclosed schematically in FIG. 7. This spring 67 is provided in the combustion chamber 4 and provides a returning force acting on the piston 2.

It is to be noted that the different types of the energy storing member 31, 34, 61, 67 described above, may be arranged in different combinations with each other, which is also illustrated in FIG. 7.

The invention is not limited to the embodiments disclosed but may be varied and modified within the scope of the following claims.

What is claimed is:

1. A device comprising:
   a combustion engine comprising a piston mechanically freely movable in a space in a housing, the piston configured to move in response to a pushing force produced by combustion of a fuel mixture in the device;
   an electromagnetic energy transducer;
   an external current circuit connected to the energy transducer, the external current circuit configured to exchange electrical effect to or from the energy transducer; and
   a control unit comprising a computer and at least a first converter having a first connection point connected to the energy transducer and a second connection point connected to the current circuit, the first converter configured to be controlled by the computer,
   wherein the control unit is configured to control a size of the electrical effect, is configured to control a direction and a size of an active effect exchanged between the energy transducer and the external current circuit during operation of the device, and is configured to feed back a reactive effect to the energy transducer, and wherein the second connection point of the first converter is connected to a first connection point of a second converter by an electric connection, and a second connection point of the second converter is connected to the current circuit.

2. A device according to claim 1, wherein the second converter is configured to be controlled by said computer.

3. A device comprising:
   a combustion engine comprising a piston, movable in a space in a housing;
   an energy transducer;
   a current circuit, connected to the energy transducer, the current circuit configured to exchange electrical effect to or from the energy transducer; and
   a control unit, comprising a computer and first converter, having a first connection point is connected to the energy transducer and a second connection point is connected to the current circuit, is the first converter configured to be controlled by said computer,
   wherein the control unit is configured to control a size of the electrical effect, is configured to control a direction and size of an active effect exchanged between the energy transducer and the current circuit during operation of the device, and is configured to feed a reactive effect to the energy transducer.

4. A device according to claim 3, wherein the control unit is configured to control the size of the electrical effect in a continuous manner.

5. A device according to claim 3, wherein the control unit is configured to control combustion in the device.

6. A device according to claim 5, further comprising:
   at least one sensor configured to sense a position of the piston in the housing.

7. A device according to claim 3, wherein said computer is configured to reproduce a function of the device.

8. A device according to claim 3, further comprising:
   an energy storing member configured to store energy generated by said combustion.

9. A device according to claim 8, wherein the energy storing is connected to the control unit.

10. A device according to claim 9, further comprising:
    a second converter connecting the energy storing member and the control unit.

11. A device according to claim 8, wherein the energy storing member comprises a capacitor.

12. A device according to claim 8, wherein the energy storing member comprises an electrochemical accumulator.

13. A device according to claim 8, wherein the energy storing member comprises a flywheel.

14. A device according to claim 8, wherein the energy storing member comprises a pressure vessel.

15. A device according to claim 8, wherein the energy storing member comprises a spring member.

16. A device according to claim 3, wherein the energy transducer comprises a primary transducer member connected to the piston and a second transducer member, the primary transducer member is movable relative to the housing and the secondary transducer member.

17. A device according to claim 16, wherein one of said primary and second transducer members comprises an electromagnetic element and another of said primary and secondary transducer members comprises a magnetic element.

18. A device according to claim 17, wherein the electromagnetic element comprises at least one winding, connecting to the current circuit.

19. A device according to claim 17, wherein the secondary transducer member comprises a plurality of electromagnetic elements disposed adjacent each other in a wall of the housing along a moving direction of the piston.

20. A device according to claim 17, wherein the electromagnetic element comprises a first soft magnetic flow carrier and the magnetic element comprises a second soft magnetic flow carrier.

21. A device according to claim 20, wherein the first soft magnetic flow carrier and the second soft magnetic flow carrier are configured to form a soft magnetic circuit.

22. A device according to claim 21, wherein the magnetic element comprises at least one permanent magnet, configured to produce a magnetizing field, and wherein the first soft magnetic flow carrier is configured to collect and concentrate magnetic flow from the permanent magnet so that a concentrated magnetic flow flows around the winding through said soft magnetic circuit.

23. A vehicle comprising:
an electric motor; and
the device according to claim 3.

24. A vehicle according to claim 23, further comprising:
a connection configured to output the electric effect.

25. A device comprising:
a combustion engine comprising a piston mechanically freely movable in a space in a housing, the piston configured to move in response to a pushing force produced by combustion of a fuel mixture in the device;
an electromagnetic energy transducer;
an external current circuit connected to the energy transducer, the external current circuit configured to exchange electrical effect to or from the energy transducer; and
a control unit comprising a computer and at least a first converter having a first connection point connected to the energy transducer and a second connection point connected to the current circuit, the first converter configured to be controlled by the computer,
wherein the control unit is configured to control a size of the electrical effect, is configured to control a direction and a size of an active effect exchanged between the energy transducer and the external current circuit during operation of the device, and is configured to feed back a reactive effect to the energy transducer, wherein the electromagnetic energy transducer comprises a primary transducer member connected to the piston and a second transducer member, the primary transducer member movable relative to the housing and the secondary transducer member, wherein one of said primary and second transducer members comprises an electromagnetic element and another of said primary and secondary transducer members comprises a magnetic element, wherein the electromagnetic element comprises a first soft magnetic flow carrier and the magnetic element comprises a second soft magnetic flow carrier, wherein the first soft magnetic flow carrier and the second soft magnetic flow carrier are configured to form a soft magnetic circuit, and wherein the second soft magnetic flow carrier has a reluctance perpendicular to a moving direction of the piston, which varies along the moving direction of the piston.

26. A device comprising:
a combustion engine comprising a piston disposed in a space in a housing, the piston configured to be moved relative to the housing in response to a pushing force produced by a combustion of a fuel mixture;
an energy transducer comprising a primary transducer member connected to the piston and a second transducer member, the primary transducer member movable relative to the housing and the secondary transducer member;
a current circuit connected to the energy transducer, the current circuit configured to exchange electrical effect to or from the energy transducer; and
a control unit comprising a computer and a first converter having a first connection point connected to the energy transducer and a second connection point connected to the current circuit, the first converter configured to be controlled by said computer,
wherein the control unit is configured to control a size of the electrical effect, is configured to control a direction and size of an active effect exchanged between the energy transducer and the current circuit during operation of the device, and is configured to feed a reactive effect to the energy transducer.

* * * * *